United States Patent [19]
Stuke et al.

[11] Patent Number: 5,243,589
[45] Date of Patent: Sep. 7, 1993

[54] METHOD FOR RECORDING INFORMATION IN AN OPTICALLY READABLE DATA MEMORY

[75] Inventors: Michael Stuke, Göttingen; Horst-Christian Langowski, Wolfratshausen; Tobias Damm, Leverkusen; Stefan Preuss, Göttingen, all of Fed. Rep. of Germany

[73] Assignee: Max-Planck-Gesellschaft zur Foerderung der Wissenschaften e.V., Goettingen, Fed. Rep. of Germany

[21] Appl. No.: 893,643

[22] Filed: Jun. 5, 1992

[30] Foreign Application Priority Data

Jun. 5, 1991 [DE] Fed. Rep. of Germany ....... 4118457

[51] Int. Cl.$^5$ ................................. G11B 7/00
[52] U.S. Cl. .................... 369/100; 369/116; 369/112; 369/118; 430/321; 430/323
[58] Field of Search .............. 369/100, 112, 116, 118; 430/270, 321, 322, 323, 326, 945

[56] References Cited

U.S. PATENT DOCUMENTS 5,171,650 12/1992 Ellis et al. ................ 430/945

FOREIGN PATENT DOCUMENTS 614548 7/1976 Switzerland .
WO89/08529 7/1989 World Int. Prop. O. .

OTHER PUBLICATIONS

"Die Computerzeitung", Sep. 21, 1983, p. 32.
Applied Physics, B 44, 199–204 (1987).
Applied Physics, A 49, 211–215 (1989).

Primary Examiner—Paul M. Dzierzynski
Assistant Examiner—Don Wong
Attorney, Agent, or Firm—Brumbaugh, Graves, Donohue & Raymond

[57] ABSTRACT

In a method for recording information in an optical data memory by surface texturing, a substrate surface is first pre-treated or sensitized by selective irradiation at relatively low fluence. For selectivity of irradiation, a mask, a holographic imaging process, or direct writing may be used. In a second step, the sensitized regions are ablated from the surface by means of spatially non-selective irradiation at a different wavelength and at relatively high fluence.

15 Claims, 2 Drawing Sheets

METHOD FOR RECORDING INFORMATION IN AN OPTICALLY READABLE DATA MEMORY

BACKGROUND OF THE INVENTION

This invention is concerned with a method for producing an optically readable data memory, such as a compact disc (CD), having a textured surface. The data memory can be used for storage of information in electronic data processing and in entertainment electronics, for example.

In a known mechanical production method for CD's, a die is pressed onto a substrate material which, typically, is still fluid in an injection molding operation. Pressing causes a desired change in surface texture or morphology. Upon suitable further treatment, a specific change is realized in optical reflection properties which can be scanned, without contact, by a laser beam of small diameter. With mechanical production of surface texture on the substrate, wear on the die is unavoidable, however, and necessitates repeated replacement of the die for large production runs. Another disadvantage of the known mechanical production method lies in that a texture pattern cannot be changed on short notice.

It is also known that information can be stored on an optically readable data medium by selective removal of a memory layer by means of an intense, focused laser beam. This method, however, requires costly high-power lasers and optics and/or special, easily vaporized coating materials. Because of the limited depth of field of the optical image at the high resolution required, this method is limited either to sequential texturing with continual refocusing, or to extremely flat substrate surfaces whose planeness far exceeds what is currently attainable for industrial plastic surfaces.

It is known further that ultraviolet (UV) absorptivity of polymethylmethacrylate (PMMA) can be locally enhanced by selective irradiation with UV light, and that the regions of enhanced absorptivity then can be selectively removed by ablation with locally non-selective exposure to longer-wavelength radiation; see S. Kuper and M. Stuke, "UV-Excimer-Laser Ablation of Polymethylmethacrylate at 248 nm: Characterization of Incubation Sites with Fourier Transform IR- and UV-Spectroscopy," *Applied Physics A*, Vol. 49, pp. 211-215 (1989). The cited paper is concerned with scientific investigation of the mechanism of ablation, is unconcerned with practical applications, and does not show the high degree of spatial resolution required for practicality.

It is an object of the present invention to produce a CD without the use of a mechanical die.

Another object of the invention with regard to an optically readable data memory, such as a CD, is to enable changing a texture pattern on short notice.

SUMMARY OF THE INVENTION

Preferred, in accordance with the invention, is a two-step method by which a surface of a storage medium is textured by non-mechanical means. In the first step, substrate regions to be removed are selectively prepared, pre-treated, incubated, or sensitized by selective optical irradiation, typically at relatively low fluence and with a relatively short wavelength (e.g., PMMA with $\lambda=248$ nm). This step is understood to result in localized increase of absorptivity with respect to second, ablating radiation. The latter is used in the second step to remove surface material from regions sensitized in the first step, typically at higher fluence and greater wavelength (e.g., $\lambda=308$ nm), and without requiring spatially patterned irradiation.

DESCRIPTION OF PREFERRED EMBODIMENTS

Figure 1:
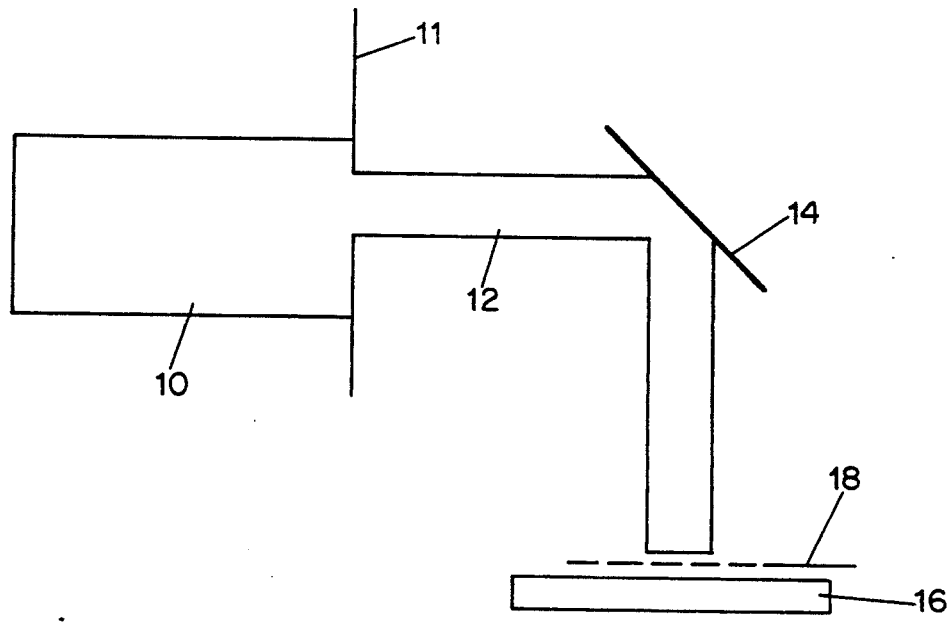
FIG. 1 is a representation of exemplary laser-beam sensitization means for a preferred embodiment of the invention.

Shown in FIG. 1 is an experimental arrangement, for illustration of the principle of sensitization. In practice, sensitization will normally be used to perform large-area definition of texture in a single irradiation step. As shown in FIG. 1, a bundle 12, for example 5 mm in diameter, is obtained from a laser beam 10 through a diaphragm 11 and directed onto a sample 16 by a mirror 14. Texturing is effected by means of a mask 18 disposed in immediate proximity to the sample to cast a shadow pattern on the sample. Irradiated regions of the sample are sensitized; shaded regions are not sensitized.

Figure 2:
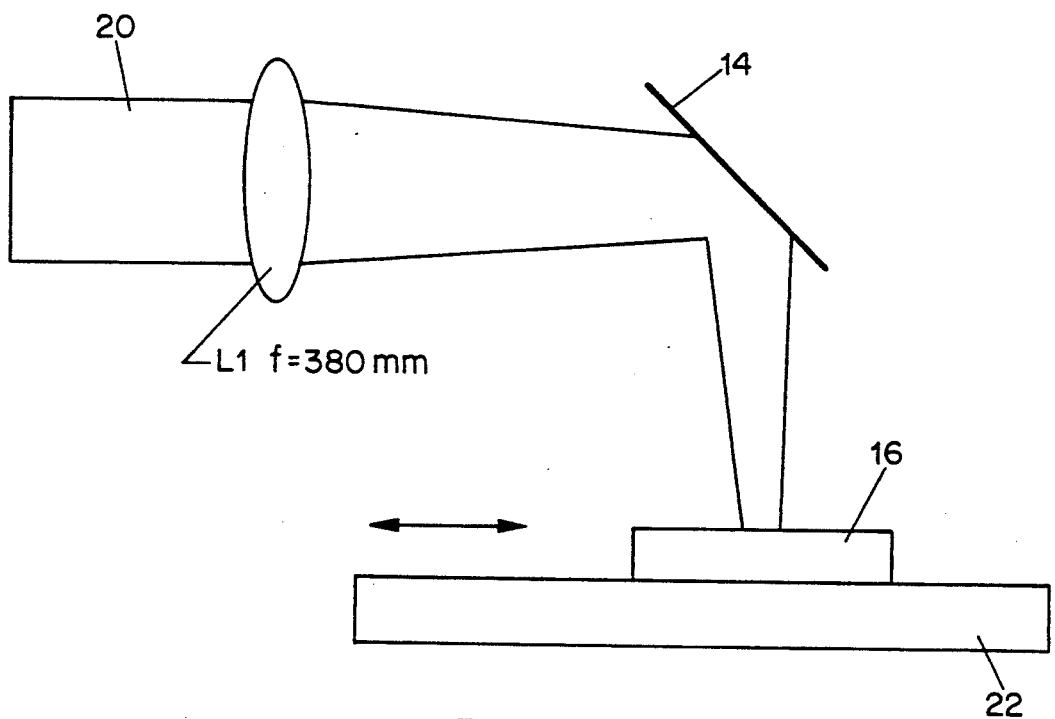
FIG. 2 is a representation of exemplary ablation means for a preferred embodiment of the invention.

FIG. 2 shows an arrangement for carrying out the ablation step. For enhanced fluence, laser radiation 20 is focused with a lens L1, so that a laser spot, e.g., 2 by 5 mm, is formed on sample 16. Homogeneity of irradiation is enhanced as the sample is moved continuously by a motor-driven translation stage 22.

Figure 3:
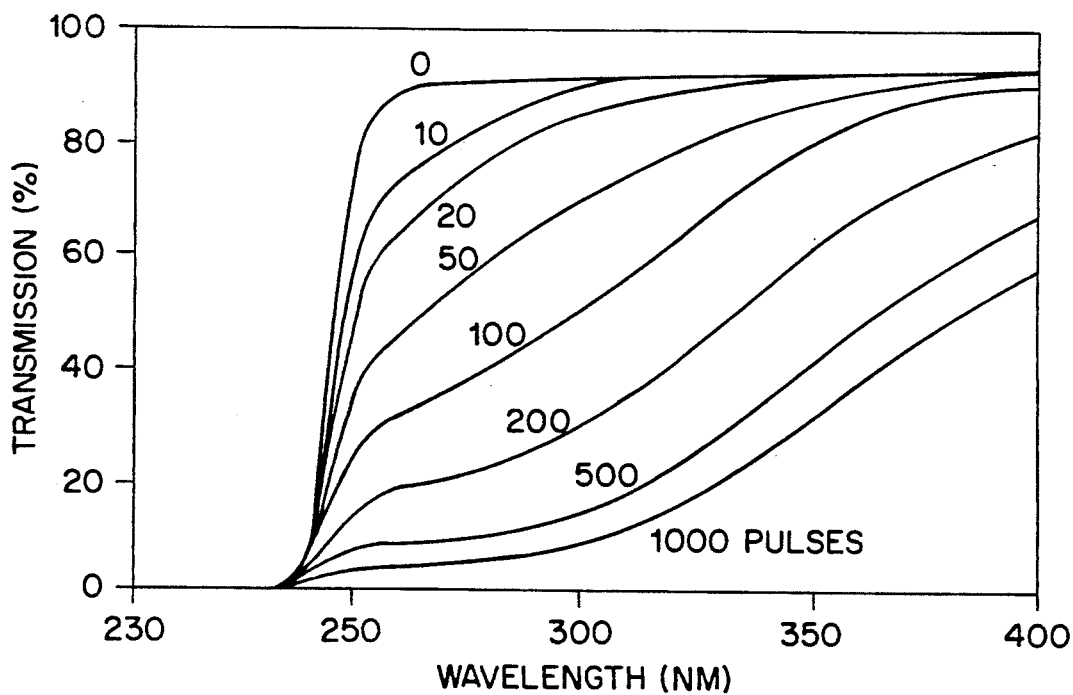
FIG. 3 includes transmission spectra of polymethylmethacrylate (PMMA) sensitized with excimer laser pulses.

FIG. 3 shows transmission spectra of PMMA after sensitizing with pulses from an excimer laser ($\lambda=248$ nm) with a fluence of approximately 40 mJ/cx$^2$. The change of absorptivity due to sensitizing can be seen to be greatest in a spectral region around 300 nm. Sensitizing does not depend on radiation intensity, but only on radiation energy and on the number of photons absorbed. When a continuous UV light source is used for sensitizing, longer exposure is required.

Figure 4:
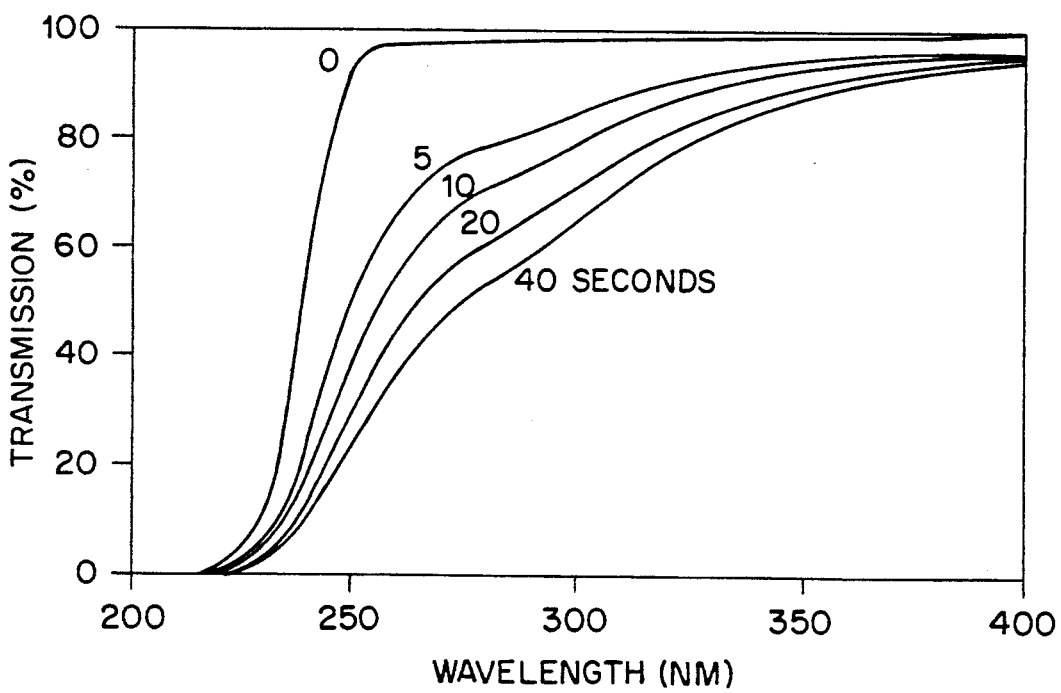
FIG. 4 includes transmission spectra of PMMA sensitized with continuous-wave ultraviolet (CW-UV) radiation.

FIG. 4 shows transmission spectra of PMMA sensitized with 1-watt CW-UV narrowband radiation at $\lambda=200-400$ nm. It can be estimated from FIGS. 3 and 4 that, to affect absorptivity at 300 nm in PMMA to the degrees shown in FIG. 3, one to several hundred seconds of exposure are required with the CW-UV radiation of FIG. 4. In the interest of preventing uncontrolled ablation, it still bears remembering that the sensitizing radiation must not be too strong.

In a preferred embodiment of the invention involving polymethylmethacrylate (PMMA) or polycarbonate (PC) substrate or base material, sensitization is with short-wavelength radiation ($\lambda<250$ nm) at relatively low fluence. As understood at present, sensitization results upon photochemical breakdown of chemical bonds and attendant changes in optical properties (increased absorption coefficient) in the irradiated regions of the substrate. By selective exposure, a desired pattern can be defined or delineated.

Locally selective sensitizing can be effected with any suitable source yielding radiation including sufficiently short wavelengths, e.g., CW lamp, UV laser, synchrotron, etc. Ablation can be effected with high-energy excimer laser pulses on the entire substrate simultaneously, so that radiation-proof masks and optics are not required.

Exemplary procedures for sensitizing are as follows, for use individually or in combination:

(a) A patterned contact mask defining the desired texture is placed in the immediate vicinity (proximity) of the substrate to be textured, and light is transmitted through the mask so that the mask pattern is imaged as a shadow pattern on the surface of the substrate.

(b) A patterned mask placed in the path of a light beam is optically projected onto the substrate on a desired scale, determined by the optics.

(c) Without use of a mask, a desired pattern is traced on the surface of the substrate by direct writing with a focused light beam.

(d) A holographic technique is used, either with an intermediate hologram analogous to a mask as in (b) above, or with an object constructed to have a hologram corresponding to the desired pattern.

Preferably, for efficacious sensitizing of the sample by irradiation with light (from a laser or a UV source, for example), the wavelength of the radiation is chosen to lie in an absorption band of the substrate material. Energy can alternatively be coupled in by way of bi- and multi-photon processes, but these require very high fluence of the sensitizing radiation. High fluence results in ablation after sensitizing with only a few pulses, resulting in progressive ablation, and requiring highly stable pulse parameters for depth control of texture.

In preliminary experiments and with the aid of Fourier spectroscopy, it was shown that changes are induced in the chemical bonding conditions in the PMMA surface upon sensitizing with pulses of an excimer laser; see the above-referenced paper in *Applied Physics* A, Vol. 49.

In the second step, sensitized material is ablated by supplying laser energy. The wavelength of the ablation laser must be so chosen that (i) the material not sensitized exhibits no significant absorption, and (ii) the sensitized material exhibits high absorption. For PMMA (as mentioned above with reference to FIG. 3) as well as for PC, sensitization strongly affects transmission near 300 nm, so that $\lambda = 308$ nm, for example, is favorable as a wavelength for ablation.

In contradistinction to sensitization, ablation is a threshold process; i.e., for thermal and photochemical removal of material, sufficient radiation intensity is required. At the sensitized sites, the depth of penetration of the ablation radiation is reduced greatly, whereby the ablation threshold is lowered significantly. The ablation threshold of untreated PMMA is about 0.6 $J/cx^2$.

In order to minimize heating of the substrate material, ablation is preferably performed with ultrashort high-energy pulses from an excimer laser. A pulse duration of 10 nanoseconds has proven effective. Shorter pulses may be used, with pulse durations down to less than 1 ps, e.g., 500 fs. Preliminary experiments have shown that, for PMMA ablation using 300-fs pulses from an excimer laser ($\lambda = 248$ nm), the fluence required for ablation is lower by a factor of 5 as compared with the use of 16-ns pulses; see S. Kuper and M. Stuke, "Femtosecond UV Excimer Laser Ablation," *Applied Physics B*, Vol. 44, pp. 199-204 (1987); see also PCT Document WO 89/08529, dated Sep. 21, 1989.

The ablation step involves non-selective irradiation of a major surface region of the substrate, i.e., ablation radiation need not be locally selective. Typically, the ablation radiation has higher intensity than the sensitizing radiation and, preferably, the ablation radiation includes longer wavelengths.

Ablation may take place in air, without contact or mechanical pressure. Sensitizing may also be in air and contact-free, although, for the sake of surface planeness when producing large textured regions in one step (e.g., a 118-mm-diameter CD pattern) on an industrial plastic surface, it will be necessary to press the surface to be textured against a suitable reference plane.

Preferred available substrate materials for CD's include plastics, glasses, and composite materials. Included among plastic materials are thermoplastics and duroplastics, and specific materials polycarbonate (PC) and polymethyl-methacrylate (PMMA).

By preferred processing in accordance with the invention, it is now possible to use short-wavelength sensitizing radiation of relatively low intensity, thereby to produce surface features having very small feature width. It has been experimentally established that such surface texturing can be used to produce features on a submicrometer scale.

According to a further aspect of the invention, the sensitization step may include surface pattern definition by direct writing, adding to a pattern defined by a mask. Thus, for example, a pattern may include standard information via a mask, and current information by direct writing. In the case of CD-format, a central region having a radius of 7.5 to 22 mm may remain shaded by the mask, to be provided with directly written information. Such information may include a serial number, identification, coding information, a security code, and/or copying protection (e.g., against copying onto Digital Audio Tape). In a traffic control system, for example, recorded permanent information can be augmented in this fashion with more current information.

The embodiments mentioned by way of example are of course not limited to CD's. Other possible products are: video discs, CD video, CD interactive, CD ROM, optical card, optically readable tape ("optical tape"), flexible, optically readable data memories of film material, and amplitude and phase holograms. Surface texture produced by processing in accordance with the invention may be adapted to the nature of a pattern (e.g., analog or digital video, CD audio, hologram) and to the read-out characteristics of corresponding reproduction equipment.

Having set forth the general nature and specific embodiments of the present invention, the true scope is now particularly pointed out in the appended claims.

We claim:

1. A method for producing an optically readable data memory, comprising:

selectively irradiating sub-portions of at least a portion of a surface of a substrate with first radiation for selective sensitization, with respect to second radiation, of surface material in said sub-portions; and non-selectively irradiating said portion with second radiation for selective removal of surface material from said sub-portions, thereby texturing the surface.

2. The method of claim 1, wherein:

the surface material consists essentially of polymethylmethacrylate or polycarbonate;

the first radiation consists essentially of first ultraviolet radiation comprising a wavelength at which absorptivity of surface material is increased by a photochemical reaction; and the second radiation consists essentially of second ultraviolet radiation having a spectrum such that material not irradiated by the first radiation remains substantially unaffected by the second radiation, and such that the material irradiated by the first radiation is ablated by the second radiation.

3. The method of claim 1, wherein the surface material is an organic material.

4. The method of claim 1 or 2, wherein the first radiation is coherent.

5. The method of claim 1 or 2, wherein the first radiation is non-coherent.

6. The method of claim 1 or 2, wherein the second radiation is non-coherent.

7. The method of claim 1 or 2, wherein at least one of the first and second radiation is produced with a laser.

8. The method of claim 7, wherein the second radiation comprises laser pulses having a duration on the order of 10 nanoseconds.

9. The method of claim 8, wherein the laser pulses have a duration of less than 1 nanosecond.

10. The method of claim 7, wherein the laser is an excimer laser.

11. The method of claim 1 or 2, wherein the first radiation includes a significant component at a wavelength in an absorption band of the surface material.

12. The method of claim 1 or 2, wherein the first radiation comprises a significant component at a wavelength less than 250 nm.

13. The method of claim 1 or 2, wherein selectively irradiating with first radiation comprises direct writing with a focused beam.

14. The method of claim 1 or 2, wherein the second radiation comprises a significant component at a wavelength of or near 300 nm.

15. The method of claim 1 or 2, wherein selective sensitization comprises irradiating a first surface region through a pattern mask, and a second surface region by direct writing.

* * * * *